(12) United States Patent
Blandford et al.

(10) Patent No.: US 8,631,007 B1
(45) Date of Patent: Jan. 14, 2014

(54) DISAMBIGUATING KEYWORDS AND OTHER QUERY TERMS USED TO SELECT SPONSORED CONTENT

(75) Inventors: Dan Blandford, Mountain View, CA (US); Oren E. Zamir, Los Altos, CA (US)

(73) Assignee: Google Inc., Mountain View, CA (US)

( * ) Notice: Subject to any disclaimer, the term of this patent is extended or adjusted under 35 U.S.C. 154(b) by 50 days.

(21) Appl. No.: 12/330,811

(22) Filed: Dec. 9, 2008

(51) Int. Cl.
*G06F 7/00* (2006.01)
*G06F 17/30* (2006.01)

(52) U.S. Cl.
USPC ........................................................ 707/736

(58) Field of Classification Search
USPC ........................................................ 707/736
See application file for complete search history.

(56) References Cited

U.S. PATENT DOCUMENTS

| | | | |
|---|---|---|---|
| 6,865,575 B1 | 3/2005 | Smith et al. | |
| 7,136,854 B2 | 11/2006 | Smith et al. | |
| 7,571,048 B2 | 8/2009 | Komatsu | |
| 7,716,162 B2 | 5/2010 | Egnor | |
| 2002/0169595 A1* | 11/2002 | Agichtein et al. | 704/9 |
| 2004/0141354 A1* | 7/2004 | Carnahan | 365/145 |
| 2004/0236725 A1* | 11/2004 | Amitay et al. | 707/3 |
| 2005/0065959 A1 | 3/2005 | Smith et al. | |
| 2005/0080775 A1* | 4/2005 | Colledge et al. | 707/3 |
| 2006/0173830 A1* | 8/2006 | Smyth et al. | 707/3 |
| 2007/0208724 A1* | 9/2007 | Madhavan et al. | 707/4 |
| 2007/0226198 A1* | 9/2007 | Kapur | 707/3 |
| 2008/0140643 A1* | 6/2008 | Ismalon | 707/5 |

OTHER PUBLICATIONS

U.S. Appl. No. 11/024,785, filed Dec. 30, 2004.
U.S. Appl. No. 11/465,771, filed Aug. 18, 2006.

* cited by examiner

*Primary Examiner* — Hosain Alam
*Assistant Examiner* — Van Oberly
(74) *Attorney, Agent, or Firm* — Fish & Richardson P.C.

(57) ABSTRACT

A disambiguation process is applied to query terms before they are used to select sponsored content. If a query term is identified as ambiguous it is replaced by phrases associated with the ambiguous term. The disambiguation process provides, as an output, these phrases for use in selecting sponsored content. One example method for identifying ambiguous query terms includes, for each of a plurality of unigrams, identifying phrases containing the unigram, measuring similarity between phrases for each pair of phrases containing the unigram and using the measured similarity to mark at least some of the plurality of unigrams as ambiguous.

21 Claims, 5 Drawing Sheets

DISAMBIGUATING KEYWORDS AND OTHER QUERY TERMS USED TO SELECT SPONSORED CONTENT

TECHNICAL FIELD

This invention relates generally to content identification.

BACKGROUND

Sponsored content commonly is placed on documents that are distributed to consumers of content on the Internet. Such sponsored content can be selected by selection engine that receives keywords or other query terms or other information (hereinafter just "query terms") as an input. The selection engine in turn selects sponsored content that matches or otherwise is associated with the provided query terms.

The query terms used to select sponsored content may come from a variety of sources. In some implementations, the query terms are derived from a target document, which will ultimately be modified to contain the sponsored content. Content of the target document can be analyzed to identify one or more query terms, represented for example by words and phrases. Sponsored content can also be associated with words and phrases, which are referred to herein as "item phrases." A matching operation can be performed between the query terms derived from the target document and item phrases associated with sponsored content in repository to select an item of sponsored content.

SUMMARY

Query terms used to select sponsored content can be ambiguous, which could result in the selection of sponsored content that is not relevant to the target document. For example, a document about how to use a camera may be analyzed to identify the query terms "focus," which in turn could be matched to sponsored content describing an automobile named "Ford Focus." Because items of sponsored content are stored in a database in association with phrases that are used to retrieve those items, a term is ambiguous if that term, when combined with different other terms, produces different phrases which access substantially different sets of items of sponsored content in the database.

Methods, systems, apparatus and computer program products are provided for disambiguating query terms that are associated with a content identification process. In one implementation, a disambiguation process is applied to unigrams (i.e., single words in the query terms) before they are used to select an item of sponsored content. The disambiguation process provides, as an output, ad phrases that replace an ambiguous unigram.

In some implementations, whether a query term is ambiguous can be determined in a pre-processing step. For example, given each unigram in a set of unigrams, all of the ad phrases that contain the unigram are identified. Similarity among all of these ad phrases for the unigram is then computed, by, for example, measuring the similarity between each pair of item phrases. This similarity can be measured using any of a number of techniques to measure similarity between sets. Example techniques can be based on documents (which may be identified by a document locator such as a uniform resource locator (URL)) associated with each item phrase. For example, the number of documents that match between the ad phrases can be used to measure similarity. A unigram can be determined to be ambiguous if the average similarity among the ad phrases associated with the unigram is less than a threshold. A set of unigrams determined to be ambiguous can be maintained, along with their associated item phrases, in what is called a phrase similarity matrix.

At run time, in some implementations, the document or URL or other information which is triggering the sponsored content is used in combination with the phrase similarity matrix to disambiguate any ambiguous query terms. If a query term is ambiguous, then the query term can be replaced in the set of query terms by, for example, item phrases associated with query term. In some implementations, only those item phrases that are determined to be most relevant (e.g., they appear in the document from which the query terms were derived) are added to the set of query terms. In some implementations, an ambiguous query term can be simply removed from the set of query terms.

Accordingly, in one aspect, one or more terms are received. It is then determined whether each of the terms is ambiguous. For each ambiguous term, the term is replaced with one or more phrases containing the term using information that associates phrases with the ambiguous term.

In another aspect, for each of a plurality of unigrams, phrases containing the unigram are identified. Similarity between phrases for each pair of phrases containing the unigram is measured. Using the measured similarity, at least some of the plurality of unigrams are marked as ambiguous.

In another aspect, a computer system can select sponsored content associated with content accessed over a computer network. A selection engine can be connected to the computer network, including a database that stores items of sponsored content associated with item phrases. A plurality of user devices can be connected to the computer network. The selection engine can be configured to receive one or more terms, to determine whether any of the terms is ambiguous, and, for each ambiguous term, to replace the term with one or more phrases containing the term using information associating phrases with the ambiguous term. The advertisement engine can be further configured to select an item of sponsored content from the database using the one or more phrases.

Various aspects may be embodied in processes performed by data processing equipment, as a tangible computer readable medium encoded with computer program instructions that instruct a computer to perform such a process, or as data processing equipment that performs such a process.

DESCRIPTION OF DRAWINGS

Like reference symbols in the various drawings indicate like elements.

DETAILED DESCRIPTION

Figure 1:
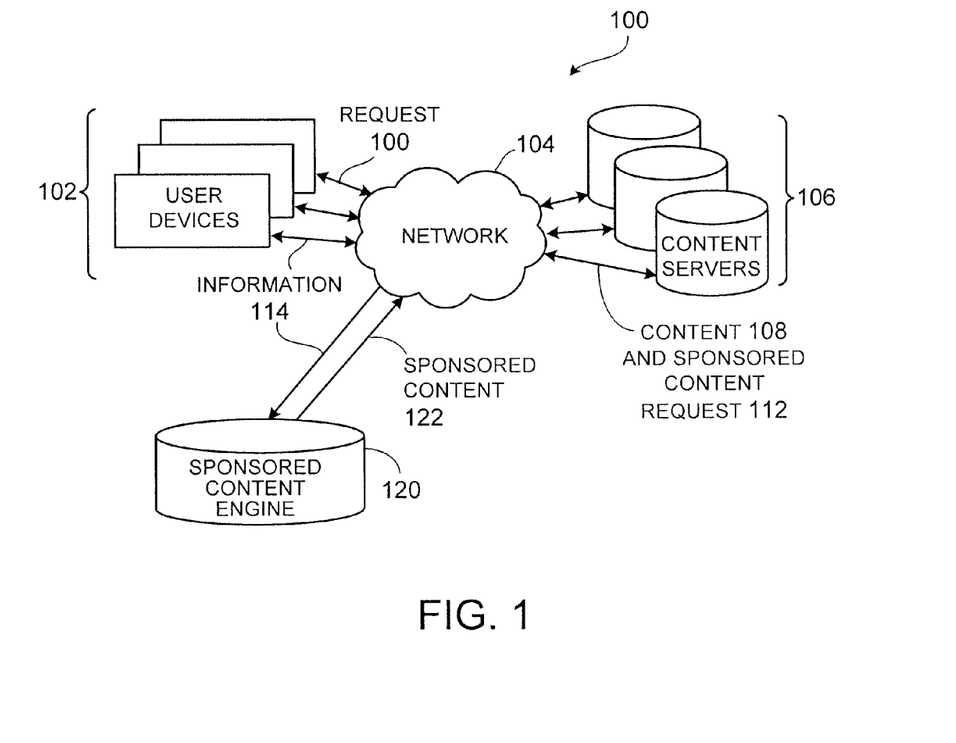
FIG. 1 is a block diagram of an example system for delivering sponsored content.

FIG. 1 is a block diagram of an example system 100 for delivering sponsored content. This system operates over a network 104, such as the Internet, and includes a plurality of user devices (e.g., computers 102), each of which connect to the network 104. Such user devices 102 can be for example, a personal computer, a business desktop computer, a handheld computer or mobile communication device or other devices enabling content retrieval and viewing. Such devices typically include browser software (not shown) that is run on the device to provide a user with the ability to access and view documents on the network 104. While reference herein is made to advertising, other forms of sponsored content can be distributed by system 100.

A plurality of content servers 106, each typically associated with one or more content sources, also are connected to the network 104. A user devices 102 can send a request 100 to a content server 106, requesting content 108. A content server 106 provides content 108 to the user devices 102 over the network 104 in response to such requests 100. The content 108 can include a sponsored content. For example, the sponsored content may be represented by a request 112 embedded in the content 108, which may be used to request another source to provide the sponsored content, such as an advertisement, to be displayed along with content 108. The content servers 106 can be of the form of computers that typically include web server software that provides the ability to serve up content to other computers in response to requests received over the network 104. Multiple different content servers 106 can provide content (e.g., page content or sponsored content such as advertising) to the requesting device.

In some implementations, when the user device 102 processes the content 108, it also identifies the request 112 and sends information 114 derived from the request to a sponsored contentengine 120. This information 114 may include query terms from which the sponsored content engine 120 may select an advertisement 122 to provide to the user device 102. The selected sponsored content 122 is received by the user device 102 and displayed with the content 108 to a user.

The transmission and content of the request 112 and the sponsored content 122 can be implemented in many ways. Although FIG. 1 illustrates the request 112 being transmitted by the user device 102 to the sponsored content engine 120, the request 112 also could be sent directly to the sponsored content engine from the content server 106. The sponsored content could be sent to the content server 106 instead of the user device 102. The request 112 may include a set of query terms or it could include information from which such query terms can be derived.

How the sponsored content engine 120 selects an advertisement sponsored content can be implemented in many ways. In some implementations, query terms are derived from a target document which will ultimately be modified to contain the sponsored content, such as the content 108 in FIG. 1. Content of the target document is analyzed to identify one or more query terms, represented, for example, by words and phrases.

In the following discussion, advertisements are used as an example of sponsored content that can be accessed. Advertisements also can be associated with words and phrases, which are referred to herein as "ad phrases." A matching operation is performed between the query terms derived from the target document and the ad phrases associated with advertisements stored in an advertisement repository to select an ad. Any appropriate matching operation may be used.

Query terms used to select an advertisement can be ambiguous, which could result in the selection of advertisements that are not relevant to the target document. For example, a document about how to use a camera may be analyzed to identify the query term "focus," which in turn could be matched to an advertisement for an automobile named "Ford Focus." Because items of sponsored content are stored in a database in association with phrases that are used to retrieve those items, a term is ambiguous if that term, when combined with different other terms, produces different phrases which access substantially different sets of items of sponsored content in the database.

Figure 2:
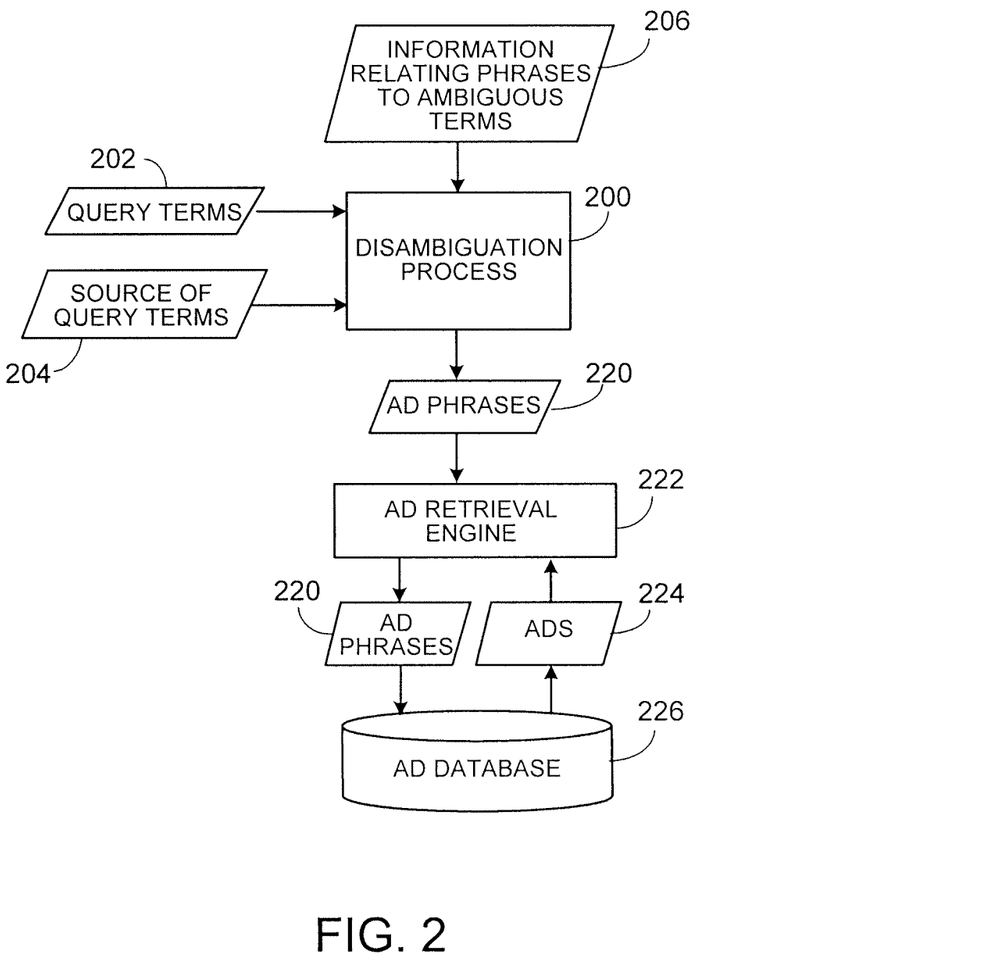
FIG. 2 is a data flow diagram of an example system for delivering sponsored content that includes a disambiguation process.

Turning now to FIG. 2, a data flow diagram of an example advertising system with a disambiguation process 200 will now be described. This disambiguation process is used to disambiguate query terms that are considered ambiguous before they are used to select an advertisement. Unigrams (i.e., single words) are often ambiguous query terms.

The disambiguation process 200 receives the query terms 202 for selecting an advertisement, which may include one or more unigrams or other ambiguous query terms. In some implementations information 204 about a source from which the query terms originated, such as the document triggering the advertisement, or a document locator, such as a URL for the document, also can be received. The disambiguation process 200 also receives information 206 that identifies, for each ambiguous query term, ad phrases that include or are otherwise related to that ambiguous query term. In some implementations, this information can be a phrase similarity matrix, which is described in more detail in connection with FIG. 6. The disambiguation process 200 determines whether each query term 202 is ambiguous, for example, by locating the query term in the information 206.

If a query term is ambiguous, the disambiguation process 200 replaces the query term in the received set of query terms 202 using one or more ad phrases associated with that query term from the information 206, to provide the output ad phrases 220. In particular, the query term can be replaced with one or more ad phrases from the information 206 if the ad phrase is also present in documents relating to the information 204. For example, in some implementations, the document from which the query terms were derived is searched for occurrences of each ad phrase associated with the ambiguous query term. Each ad phrase that occurs in the document can be added to the output ad phrases, replacing the ambiguous query term. In some implementations, an ambiguous query terms can be simply removed from the list of query terms. The ad phrases 220 output by the disambiguation process 200 are in turn used by an ad retrieval engine 222 to select an advertisement 224 from an ad database 226.

Figure 3:
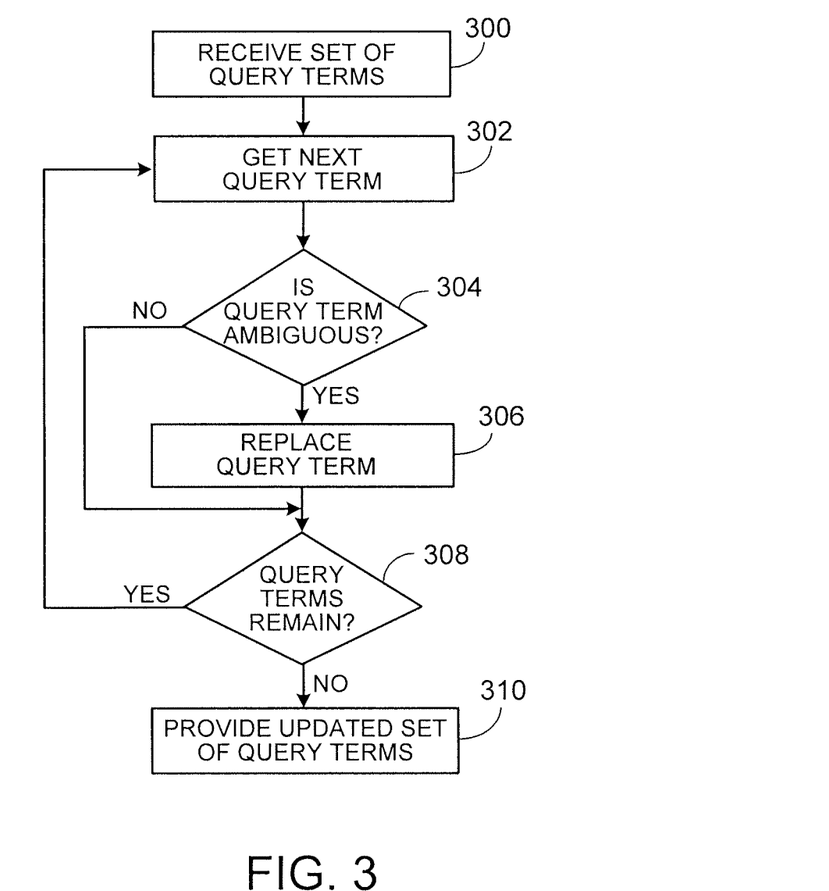
FIG. 3 is a flow chart describing an example process for disambiguating unigrams.

Referring to FIG. 3, an example process for disambiguating query terms, to be performed by the system shown in FIGS. 1-2, will now be described. At the time of advertisement selection, a set of query terms is received 300. For each query term, as indicated at 302, it is determined 304 if the query terms ambiguous, for example by looking up the query term in a phrase similarity matrix (described below). If the query term is ambiguous, then it is replaced 306 in the set of query terms by, for example, one or more ad phrases associated with the query term. If the last query term has been evaluated, as indicated at 308, then the updated set of query terms including the ad phrases can be provided 310 to the ad retrieval engine to select ads. Otherwise, the next query term is evaluated, as indicated at 302 until all the query teens have been evaluated.

In some implementations, determining whether a query term is ambiguous can be based on processing performed prior to the receipt of the set of query terms used to request an advertisement or other content. In particular, the information 206 that identifies, for each ambiguous query term, ad phrases that include or are otherwise related to that ambiguous query term, can be determined periodically for a large set of possible query terms. The information 206 then is used at the time each advertisement is requested, to disambiguate the received query terms before accessing advertisements.

Figure 4:
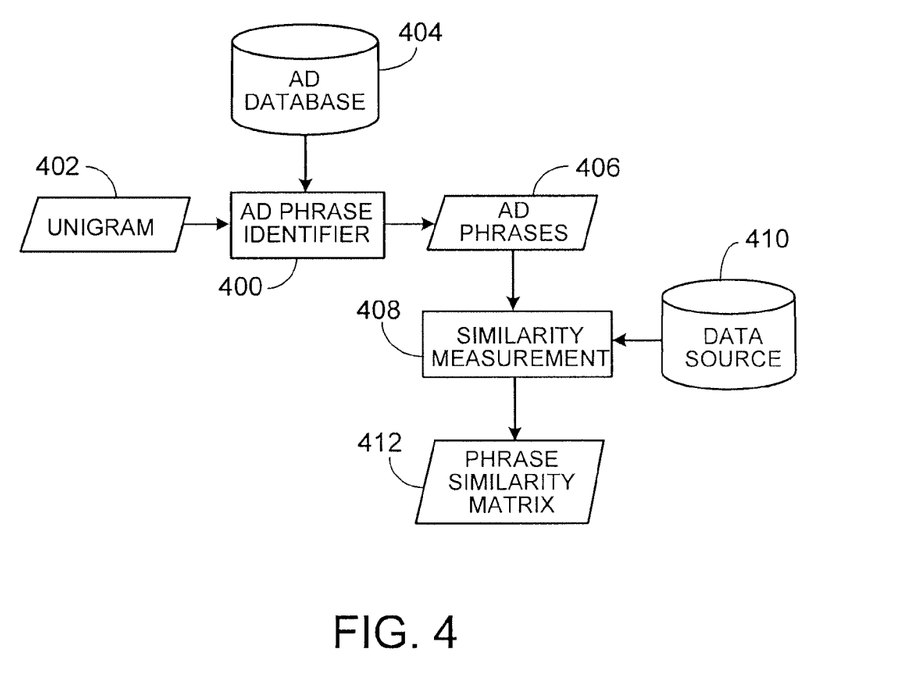
FIG. 4 is a data flow diagram describing an example system for identifying ambiguous unigrams.

Turning now to FIG. 4, a data flow diagram of an example advertising system that generates the information that identifies, for each ambiguous query term, ad phrases that include or are otherwise related to that ambiguous query term, will now be described. In FIG. 4, an ad phrase identifier 400 receives a set of unigrams 402. The set of unigrams can be derived from indexes of document, logs of query terms from a search engine, etc., for example. The ad phrase identifier also accesses an ad database 404, which includes ads associated with ad phrases. For each unigram, the ad phrase identifier identifies the ad phrases 406 in the ad database that include the unigram. In some implementations, ad phrases that are superstrings of other ad phrases can be eliminated from the ad phrases 406. Similarity measurement 408 receives the ad phrases 406 and accesses a data source 410 that enables the similarity among the ad phrases to be compared. Similarity measurement 408 evaluates similarity between ad phrases for each pair of ad phrases containing the unigram using information from the data source 410. Using the measured similarity for the ad phrases containing a unigram, unigrams may be marked as ambiguous. For example, if the average (in some implementations, a median) similarity among the ad phrases containing the unigram is less than a threshold, then the unigram is considered ambiguous. A unigram can be marked as ambiguous, for example, by placing the unigram in a phrase similarity matrix, described below in connection with FIG. 6, that relates the unigram to the ad phrases that contain, or are otherwise related to, the unigram. The phrase similarity matrix can be provided as the information 206 used in the disambiguation process described in FIG. 2.

An example way for evaluating similarity among ad phrases related to a query term and, in turn, evaluating whether the query term is ambiguous, will now be described. Given a unigram "X," there may be several ad phrases that contain "X," such as X1, X2, X3, X4, X5. For each pair of ad phrases, a measure of their similarity is determined. This similarity can be measured using any of a number of techniques to measure similarity between sets. Example techniques can be based on a number of documents that contain both ad phrases, relative to the number of documents that contain each ad phrase. Similarity also can be measured using advertisement inventory or other information sources. This number of documents can be determined from an index of documents, from which a mapping of ad phrases to document identifiers, such as uniform resource locators (URLs) can be generated. For example, if there are 100 URLs representing documents that contain ad phrase X1 and 100 URLs representing documents that contain ad phrase X2, but there are only 150 unique URLs among them, then there are 50 URLs that match between ad phrase X1 and ad phrase X2. The similarity value can be a function of this number of matching URLs (50). An example function can be the ratio between the number of matching URLs and the total number of URLs among the ad phrases. For example, a cosine similarity metric can be used, so that the measure of similarity is in the range of 0 to 1. The number of matching URL divided by the product of the square root of the number of URLs for the first phrase and the square root of the number of URLs for the second phrase, can be used. An average (such as a mean, median, geometric mean, etc.) of the similarity measures of the pairs of ad phrases associated with the query term is then computed. Using the cosine similarity metric described above, an average similarity measure of less than 0.2, for example, can be used to indicate an ambiguous query term. The unigram and the list of related ad phrases can be placed in a phrase similarity matrix, described below in connection with FIG. 4.

In some cases, no benefit is derived from disambiguating a unigram. For example, if a set of ads associated with a unigram is substantially the same set of ads associated with the ad phrases with which the unigram could be replaced, then there would be no benefit to be derived from disambiguating the unigram. Accordingly, in some implementations, the advertisement database is accessed using a unigram and the ad phrases with which the unigram could be replaced. If the set of ads returned for each ad phrase is substantially the same as the set of ads returned fro the unigram, then the unigram is not marked as ambiguous. As an example, if ninety percent (90%) of the advertisements received using each phrase are the same as the advertisements retrieved using the unigram, then the unigram is considered not ambiguous and is not placed in the phrase similarity matrix.

Figure 5:
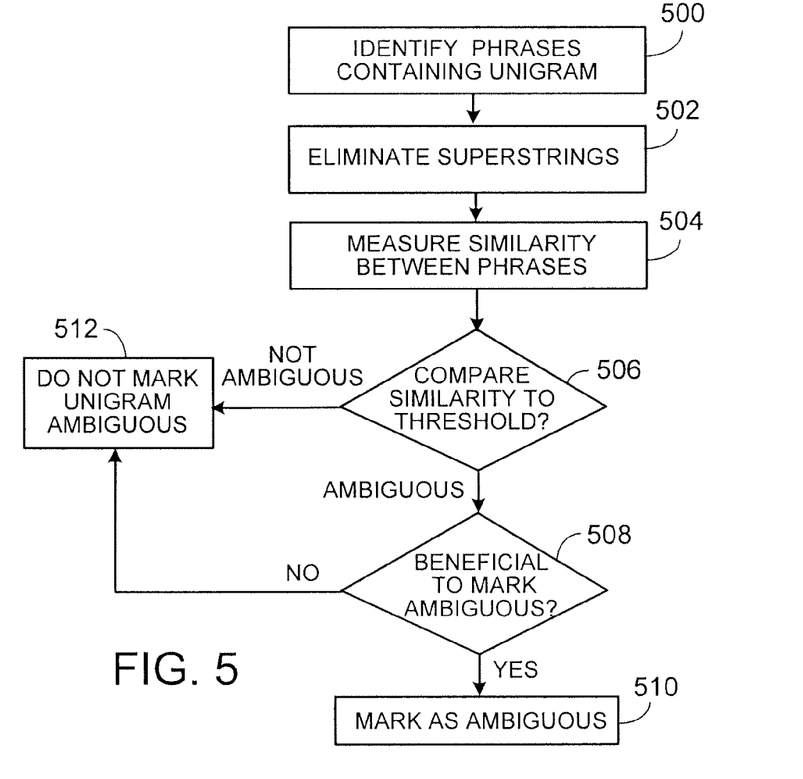
FIG. 5 is a flow chart describing an example process for identifying ambiguous unigrams.

A flow chart describing a process for identifying ambiguous query terms as performed by the system of FIG. 4, will now be described in connection with FIG. 5. In this example, unigrams are processed. In FIG. 5, for each of a plurality of unigrams, ad phrases containing the unigram are identified 500. In some implementations, ad phrases that are superstrings of other ad phrases can be eliminated 502 from the ad phrases identified in step 500. Similarity is measured 504 between ad phrases for each pair of ad phrases containing the unigram. The measured similarity for the pairs of ad phrases is compared to a threshold, as indicated at 506, to identify whether the unigram is ambiguous. If the unigram is ambiguous, then it is then determined whether disambiguating the unigram is beneficial, as indicated at 508. If disambiguating the unigram is beneficial, then the unigrams is marked 510 as ambiguous. For example, the unigram and its set of related ad phrases may be placed in a phrase similarity matrix. If the unigram is not considered ambiguous, or if disambiguating the unigram is not beneficial, then the unigram is not marked 512 as ambiguous. The unigrams that are marked as ambiguous can be disambiguated if they appear in a set of query terms for accessing advertisements or other content.

Figure 6:
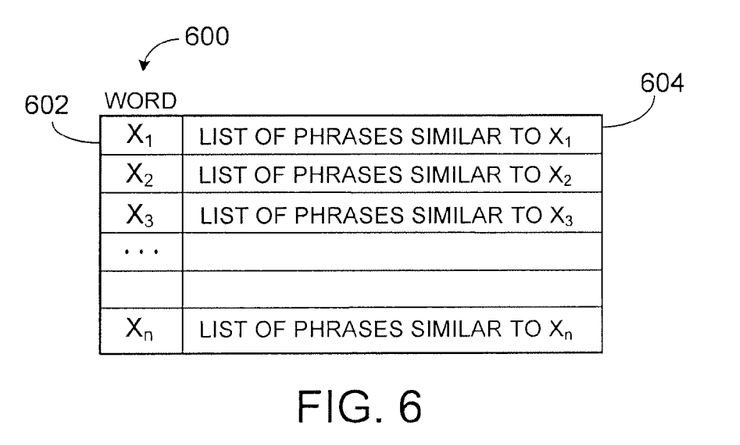
FIG. 6 depicts an example phrase similarity matrix.

An example phrase similarity matrix, for illustration, is shown in FIG. 6. The phrase similarity matrix 600 provides for each ambiguous query term 602, a set of related ad phrases 604. A query term can be marked as ambiguous by its presence in the phrase similarity matrix. Thus, to determine if a query term in ambiguous, a lookup operation using the query term will yield the list of related ad phrases 604 if the query term is ambiguous, and no list of related ad phrases if the query term is not in the phrase similarity matrix.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The computing system can include clients and servers. A client and server are generally remote from each other and typically interact over a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, comprising:
    receiving data in a memory of a computer, wherein the data includes one or more terms;
    accessing, with the computer, a database of sponsored content, wherein each item of sponsored content in the database is associated with one or more phrases, wherein the phrases are used to access the sponsored content;
    determining, with a processor of the computer that accesses the data in the memory, whether any of the terms is ambiguous such that the term, when combined with different other terms, produces different phrases which access substantially different sets of items of sponsored content in the database including identifying a first phrase that is a combination of an ambiguous term and one or more terms of the different other terms and identifying a second phrase that is a combination of the ambiguous term and one or more other terms of the different other terms wherein the first phrase and the second phrase access different sets of items of the sponsored content wherein determining a term is ambiguous includes
        identifying a plurality of phrases that contain or are related to the term;
        for each pair of phrases, determining a measure of similarity including determining a number of co-occurrences of the pair of phrases in a set of documents and a number of single occurrences of a phrase in the pair of phrases in the documents;
        determining that the pair of phrases are similar when the measure of similarity is above a threshold; and
        determining a term is ambiguous when two or more phrases of the plurality of phrases are dissimilar;
    for an ambiguous term, replacing the term in the data in the memory wherein replacing the term comprises replacing the term by selecting either the first or the second phrase both of which include the ambiguous term; and
    selecting, from the database, sponsored content using the selected one of either the first or the second phrase.

2. The computer-implemented method of claim 1, wherein replacing further comprises determining whether the first or second phrases are present in a source from which the received terms were derived.

3. The computer-implemented method of claim 2, wherein replacing includes using a phrase similarity matrix, the phrase similarity matrix including, for each ambiguous term, one or more phrases associated with the ambiguous term.

4. The computer-implemented method of claim 1, wherein replacing includes using a phrase similarity matrix, the phrase similarity matrix including, for each ambiguous term, one or more phrases associated with the ambiguous term.

5. The computer-implemented method of claim 1, wherein the sponsored content comprises advertisements.

6. The computer-implemented method of claim 1, wherein replacing comprises removing the ambiguous term from the one or more terms.

7. A computer-implemented method, comprising
    receiving a request for content including a plurality of unigrams, the unigrams being used as a criteria in determining one or more relevant content items from an inventory of content items to be presented responsive to the request;
    for each of the plurality of unigrams:
    using a processor of a computer system, identifying phrases containing the unigram, wherein each item of sponsored content in the inventory is associated with one or more phrases;
    measuring, using the processor of the computer system, similarity between phrases for each pair of phrases containing the unigram based at least in part on a number of documents that include the pair of phrases including determining a count of a number of occurrences of each phrase in a pair that occur in a respective document wherein measuring further includes,
    for each pair of phrases, determining a measure of similarity including determining a number of co-occurrences of the pair of phrases in a set of documents and a number of single occurrences of a phrase in the pair of phrases in the documents;
    determining that the pair of phrases are similar when the measure of similarity is above a threshold; and
    determining a unigram is ambiguous when two or more phrases of the plurality of phrases are dissimilar; and
    using the measured similarity to mark, in storage accessed by the computer system, at least some of the plurality of unigrams as ambiguous.

8. The computer-implemented method of claim 7, wherein measuring similarity between a pair of phrases includes:
    identifying documents associated with each phrase;
    determining a number of documents shared by both of the phrases; and
    computing a ratio between a function of the number of shared documents to a function of a total number of documents associated with both of the phrases.

9. The computer-implemented method of claim 8, wherein the documents are identified using uniform resource locators.

10. The computer-implemented method of claim 7, wherein the phrases are phrases associated with sponsored content in a database.

11. The computer-implemented method of claim 10, further comprising selecting an item of sponsored content from the database using the phrases.

12. The computer-implemented method of claim 11, further comprising:
receiving terms for selecting an item of sponsored content;
replacing at least one term that is a unigram marked as ambiguous.

13. The computer-implemented method of claim 12, wherein replacing comprises replacing the term that is a unigram marked as ambiguous with one or more phrases containing the unigram; and further comprising:
selecting an item of sponsored content using the one or more phrases that replaced the ambiguous unigram.

14. The computer-implemented method of claim 12, wherein replacing comprises removing the unigram marked as ambiguous from the terms.

15. A computer system for selecting sponsored content associated with content accessed over a computer network, comprising:
a selection engine connected to the computer network, including a database including sponsored content associated with phrases;
a plurality of user devices connected to the computer network;
the selection engine being configured to receive one or more terms, to determine whether any of the terms is ambiguous such that the term, when combined with different other terms, produces different phrases which are associated with substantially different sets of items of sponsored content in the database, including to identify a first phrase that is a combination of an ambiguous term and one or more terms of the different other terms and identifying a second phrase that is a combination of the ambiguous term and one or more other terms of the different other terms and wherein the first phrase and the second phrase access different sets of items of the sponsored content, wherein determining a term is ambiguous includes
identifying a plurality of phrases that contain or are related to the term;
for each pair of phrases, determining a measure of similarity including determining a number of co-occurrences of the pair of phrases in a set of documents and a number of single occurrences of a phrase in the pair of phrases in the documents;
determining that the pair of phrases are similar when the measure of similarity is above a threshold; and
determining a term is ambiguous when two or more phrases of the plurality of phrases are dissimilar; and, for an ambiguous term, to replace the ambiguous term including selecting either the first or the second phrase both of which include the ambiguous term;
the selection engine being further configured to select an item of sponsored content from the database using the selected one or the first or second phrase.

16. The computer system of claim 15, wherein replacing further comprises determining whether the first or second phrase are present in a source from which the received terms were derived.

17. The computer system of claim 16, wherein replacing further includes using a phrase similarity matrix, the phrase similarity matrix including, for each ambiguous term, one or more phrases associated with the ambiguous term.

18. The computer system of claim 15, wherein replacing includes using a phrase similarity matrix, the phrase similarity matrix including, for each ambiguous term, one or more phrases associated with the ambiguous term.

19. The computer system of claim 15, wherein the phrases are phrases associated with advertisements in a database.

20. The computer system of claim 19, further comprising selecting an item of sponsored content from the database using the first or second phase.

21. The computer system of claim 15, wherein the ambiguous term is removed from the one or more terms.

* * * * *

UNITED STATES PATENT AND TRADEMARK OFFICE
CERTIFICATE OF CORRECTION

PATENT NO.        : 8,631,007 B1                                          Page 1 of 1
APPLICATION NO. : 12/330811
DATED             : January 14, 2014
INVENTOR(S)       : Blandford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 124 days.

Signed and Sealed this

Thirtieth Day of May, 2017

Michelle K. Lee
*Director of the United States Patent and Trademark Office*